No. 723,480. PATENTED MAR. 24, 1903.
F. S. McWHORTER.
POTATO PLANTER.
APPLICATION FILED JAN. 13, 1902.
NO MODEL. 5 SHEETS—SHEET 1.

Witnesses
Inventor
Francis S. McWhorter
By
Attorneys

No. 723,480. PATENTED MAR. 24, 1903.
F. S. McWHORTER.
POTATO PLANTER.
APPLICATION FILED JAN. 13, 1902.
NO MODEL. 5 SHEETS—SHEET 2.

No. 723,480. PATENTED MAR. 24, 1903.
F. S. McWHORTER.
POTATO PLANTER.
APPLICATION FILED JAN. 13, 1902.

NO MODEL. 5 SHEETS—SHEET 3.

Witnesses
L. Courville,
O. F. Aagle.

Inventor
Francis S. McWhorter
By Gudersheim Fairbank
Attorneys

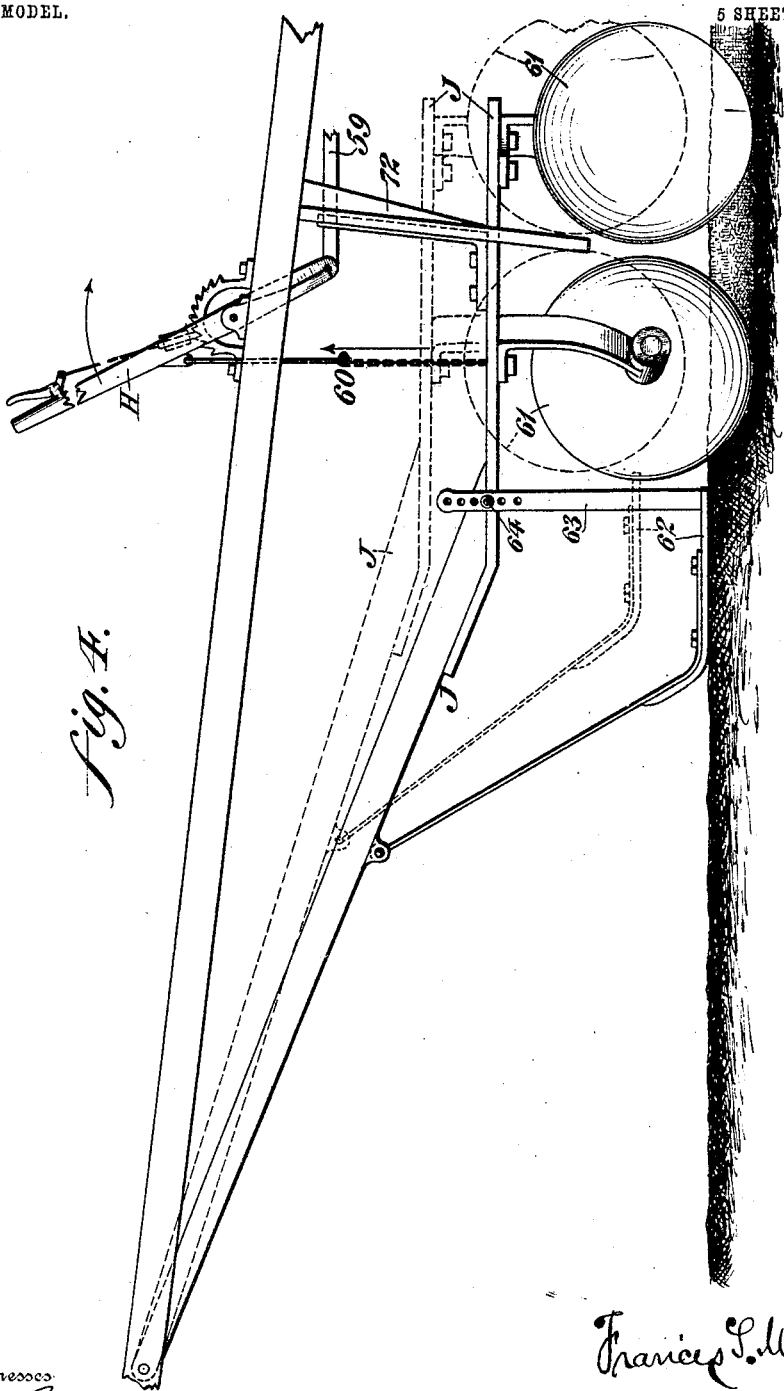

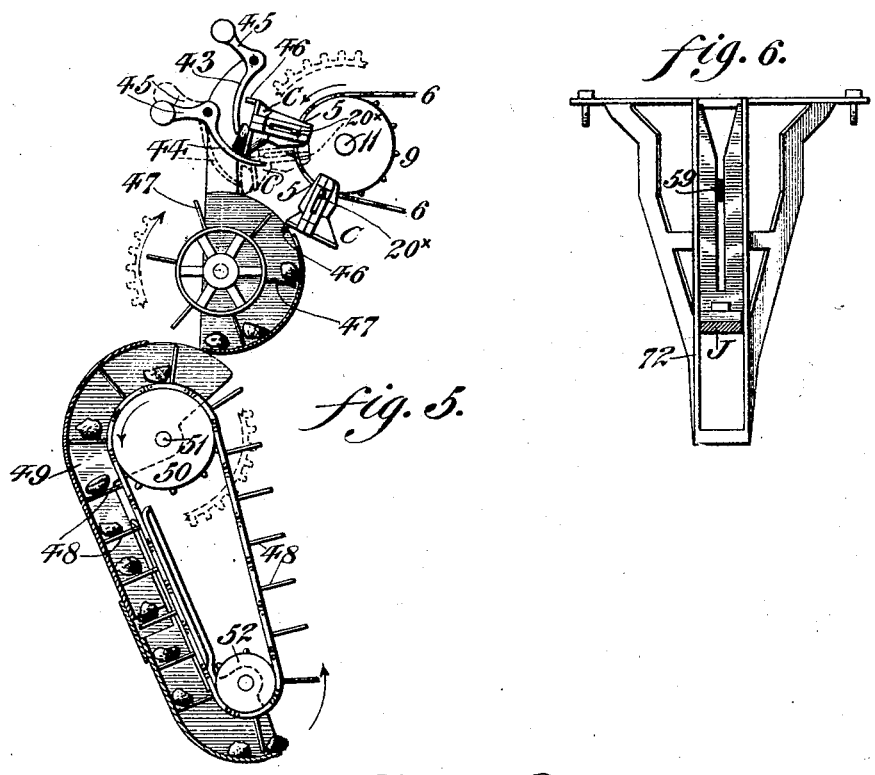

UNITED STATES PATENT OFFICE.

FRANCIS S. McWHORTER, OF PHILADELPHIA, PENNSYLVANIA, ASSIGNOR TO McWHORTER MANUFACTURING COMPANY, A CORPORATION OF NEW JERSEY.

POTATO-PLANTER.

SPECIFICATION forming part of Letters Patent No. 723,480, dated March 24, 1903.

Application filed January 13, 1902. Serial No. 89,476. (No model.)

*To all whom it may concern:*

Be it known that I, FRANCIS S. MCWHORTER, a citizen of the United States, residing in the city and county of Philadelphia, State of Pennsylvania, have invented a new and useful Improvement in Potato-Planters, of which the following is a specification.

My invention relates to improvements in potato-planters; and it consists of cells which are primarily supplied with potatoes, means for primarily removing surplus potatoes, a device for impaling one of the same, means for forcibly impelling the impaling device to its work, a holding device for the potato while being impaled, means for overturning the cells and discharging the surplus potatoes, means for restoring the cells to their normal positions, an auxiliary hopper for receiving the surplus potatoes, means for returning the latter to the primary hopper, an agitator for the hopper of the surplus potatoes, an agitator for the feed-chute for preventing clogging therein, means for withdrawing the impaling device from the potato, a detaining device for the latter as the cell overturns at the front end of its carrier, a pocketed device adapted to receive the potato as it leaves the front cell, a pocketed carrier leading from said device toward the ground to drop the potato thereon, coverers rearward of the same, and other details of construction, as will be hereinafter set forth.

The several parts will be hereinafter specified and the novel features of the invention pointed out in the claims that follow the same.

Figure 1:
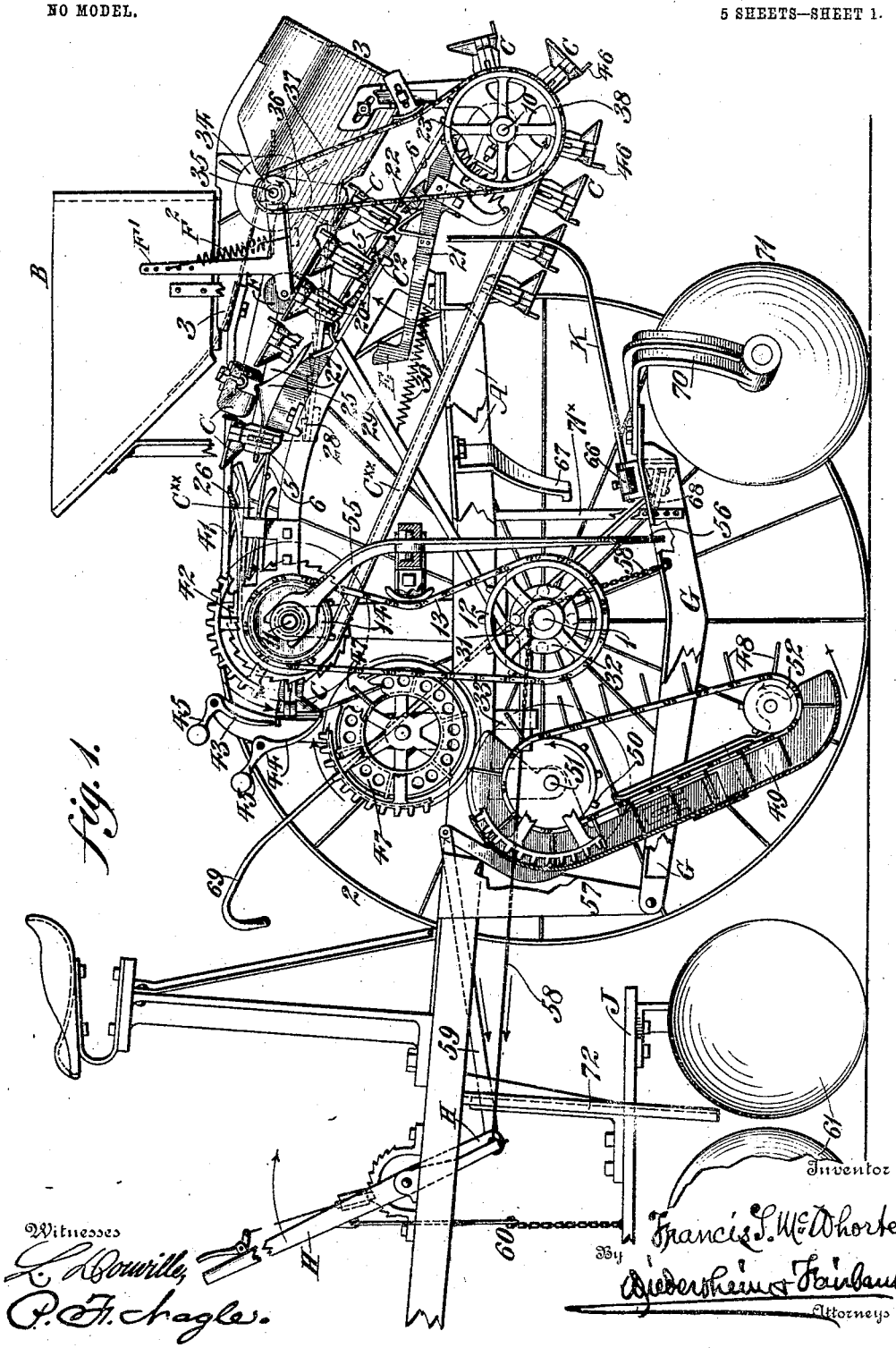
Figure 2:
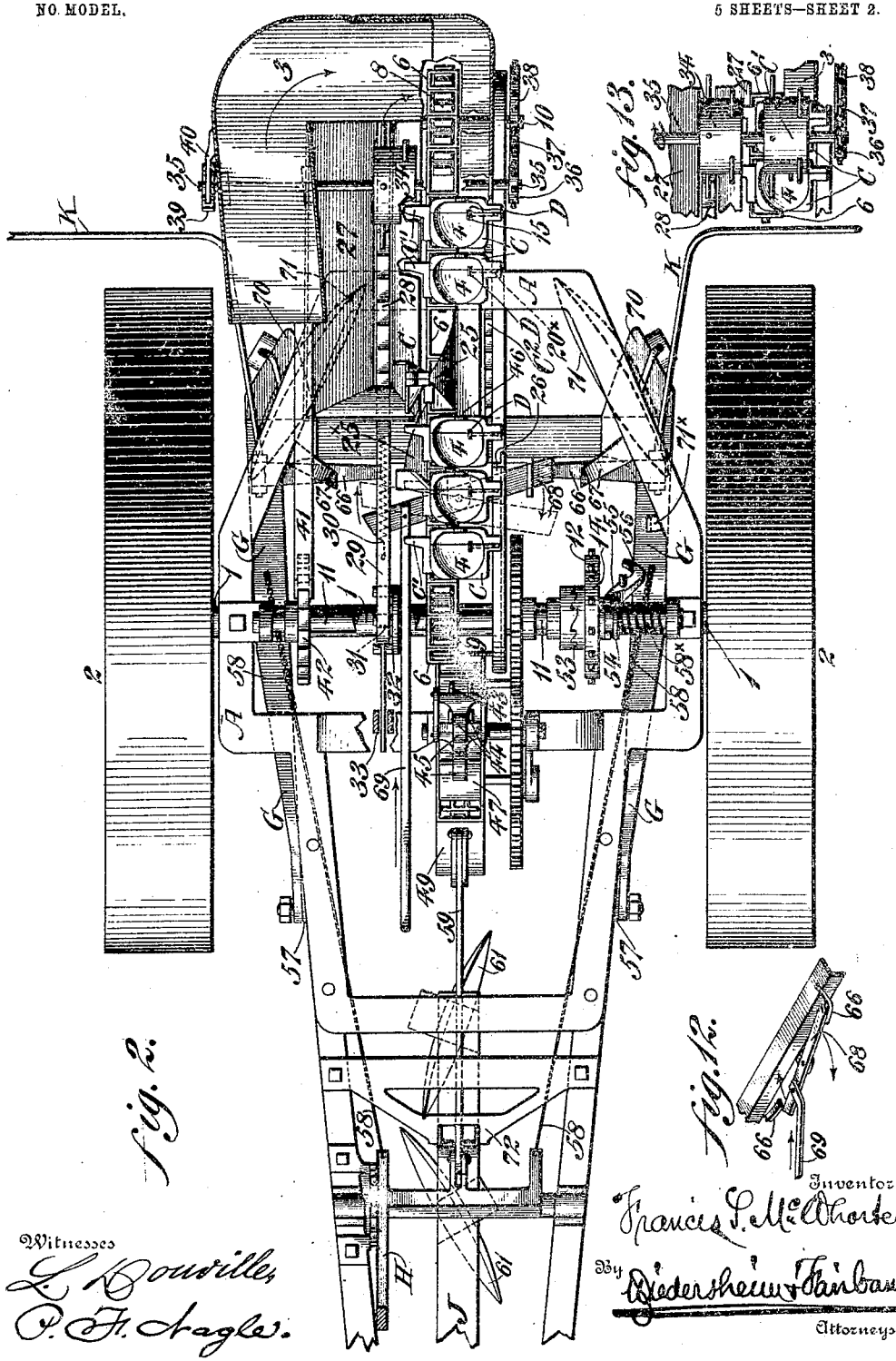
Figure 3:
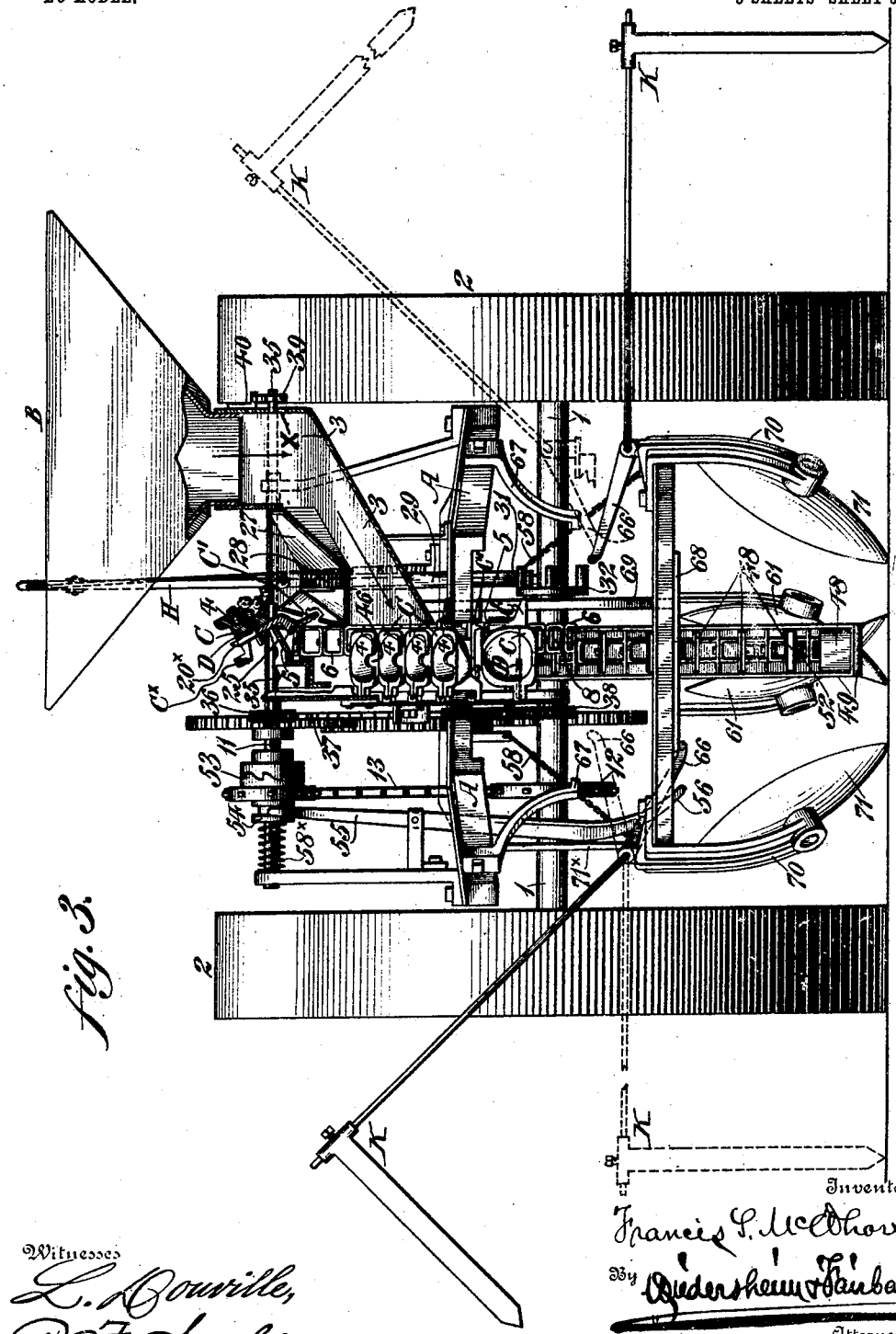

Figure 1 represents a side elevation of a potato-planter embodying my invention. Fig. 2 represents a top or plan view thereof. Fig. 3 represents a rear view thereof. Fig. 4 represents a side elevation of the front portion of the machine detached. Fig. 5 represents a vertical section of another front portion of the machine. Fig. 6 represents a front view of a guiding device of certain parts of the machine. Figs. 7 and 8 represent end views of the potato-receiving cells of the machine. Fig. 9 represents a top view thereof. Fig. 10 represents an end view of the impaling device. Fig. 11 represents a view of the friction mechanism of said device. Fig. 12 represents a perspective view of a portion of the marker-adjusting mechanism. Fig. 13 represents a top view of a portion of the mechanism removed from the right hand of Fig. 2.

Similar letters and numerals of reference indicate corresponding parts in the figures.

Referring to the drawings, A designates the frame of the planter, on which is mounted the axle 1 of the wheels 2 thereof.

B designates a hopper which is supported on the frame A and has at the base thereof the laterally-extending chute 3, the outlet end of which is over the cells C, which are to be supplied with potatoes from said hopper, said cells being formed of pieces of metal or other suitable material having depressions 4 in the upper faces thereof, and, furthermore, pivoted on one side, as at 5, to the endless chain or apron 6, the latter passing around the sprocket-wheels 8 and 9, the shafts 10 and 11 of which are mounted on the frame A. Power is communicated to said apron 6 by means of the sprocket-wheel 12 on the axle 1, the sprocket-chain 13, and the sprocket-wheel 14 on the shaft 11.

C' designates a toothed or fingered wheel which is located over the cups or cells C near the outlet end of the chute 3, the same being employed for removing surplus potatoes primarily fed to said cells or cups. (See Fig. 13.)

C² designates racks secured to the frame and having the cells ride thereon, so as to shake the cells, and consequently agitate the potatoes therein, so as to be properly seated in the bottom thereof. In each cell C is a vertical groove 15, (see Fig. 8,) in which is freely fitted the guiding stem or bar 16 of the spear or piercer D, the latter being carried by the head 17 on the lower end of said stem, said spear being adapted to be raised and enter an opening 8 in the base of the depression of the cell and afterward lowered therefrom. In order to retain the spear D in the position in which it is set to prevent the same from losing its hold on the potato pierced on account of the gravity of its parts, I employ the spring 19, which occupies the box 20 on the side of the cell and bears against the stem 16, (see Figs. 9 and 11,) and thus causes friction on said stem. On the sides of the heads 17 are feet $20^\times$, which project laterally therefrom. (See Figs. 2 and 10.) On the cells are feet $C^\times$, which enter the grooved bar $C^{\times\times}$ to prevent sagging of the chain or apron 6. Below the upper length of the apron 6 is mounted the rocking beam 21, one end of which carries the hammer E, which is so disposed as to strike the head 17, so as to raise the same, and thus cause the spear D to pierce the potato, it being seen that the upper side of the beam 21 has an elevated shoulder or shoe 22 thereon, the same being adapted to bear against the under side of each cell, and thus depress the hammer end of said beam. A spring 23 is secured to said beam opposite to the hammer, the tendency of which is to raise said hammer, it being evident that as the cells travel along, due to the motion of the endless apron 6, the shoulder 22 is engaged by one of the cells, (see Fig. 1,) thus lowering the hammer E, and when said cell clears said shoulder the latter is tripped, whereby the spring 23 quickly raises said hammer and causes the latter to forcibly strike the foot of the spear in the cell in advance of the one just above referred to, so that the spear is driven into the potato from below, thus impaling the latter and preventing displacement of the same until the proper time for its release. It is, however, important to hold the potato as the spear advances thereinto. For this purpose I employ the pressure-roller F, which is mounted on the oscillating arm F', which is mounted adjacent to the cells and engaged by the spring $F^2$, it being noticed in Fig. 1 that as the cells travel with the apron 6 said roller drops into each cell presented under it, its bearing-arm F' yielding upwardly after the roller has performed its operation, so that the next cell may advance without interference of said roller.

It will be noticed that several of the cells have been removed from the apron 6 for purposes of clearness in properly perceiving other parts, which otherwise would be concealed or obscured.

At the side of the apron 6 there is mounted on the frame A the tapering piece 25, which is adapted to engage with the base of the cells, and thus raise the latter and overturn or tip them in order to discharge the surplus number of potatoes. (See Fig. 3.) In advance of said piece 25 is the tapering piece $25^\times$, which is designed to return the overturned cells to their normal positions by engaging with the fingers C' on the couplings of the cells and apron 6.

On the frame adjacent to the front sprocket-wheel 14 is the shoe 26, which is so disposed that the feet $20^\times$ successively ride under and are engaged by the same, thus lowering the spears and relieving the potato of engagement.

Aside of the piece 25 is the supplemental hopper 27, the base of which is occupied by the reciprocating serrated bar or conveyer 28 for the return of the surplus potatoes, said hopper 27 opening into the portion 3 of the hopper proper. In order to impart motion to said conveyer, I employ the rod or bar 29 and spring 30, said rod being connected with said conveyer 28 and having a shoulder 31, which is adapted to be engaged by the trundle or other toothed wheel 32, which is mounted on the axle 1, (see Figs. 1 and 2,) the free end of said rod being fitted in the guide 33 on the frame A. The spring 30 is connected with the rod 29 and a fixed member of the frame, and thus, owing to said trundle-wheel and spring, motions are imparted to the conveyer 28 in opposite directions, it being noticed, more particularly in Figs. 1, 2, and 3, that as the surplus potatoes fall into the hopper 27 they are impelled rearward by the action of the conveyer, and so directed to the portion 3 of the hopper proper in order to be resupplied to the cells C. In order to agitate the surplus potatoes in the hopper 27 and assist in the return motion thereof, I employ the toothed or fingered wheel 34, which occupies said hopper and is secured to the shaft 35, on which latter the toothed or fingered wheel C' is also mounted, said shaft also in the present case having mounted on it the arm F', which carries the roller F, said shaft being mounted on the frame A and receiving power from the sprocket-wheel 36, chain 37, and sprocket-wheel 38, the latter being carried by the shaft 10, it being evident that the teeth or fingers of the wheel 34 rotate in the potatoes in the hopper 27 and assist in preventing clogging of the same.

For primarily agitating the potatoes in the chute 3 I employ the ratchet-wheel 39, which is mounted on the end of the shaft 35, which passes through an opening X in said chute, said opening being enlarged in vertical direction to permit said chute to rise and fall to a limited extent. The wheel 39 engages with the tripping-arm 40 on the side of the chute, so that as said shaft rotates the ratchet first raises the chute and then allows it to drop, causing an up-and-down motion to said chute. An up-and-down swinging motion is also imparted to said chute 3 by means of the bar 41, which is connected at its rear end with said chute, it being here noticed that the latter has a slight rotary motion on the shaft 35, and the forward end of said bar rests on the teeth of a ratchet-wheel 42, which is mounted on the shaft 11, the latter receiving motion from the axle 1, as has been stated, whereby as said ratchet-wheel rotates up and down motions are imparted to the bar 41, and consequently the chute 3, thus shaking the latter and agitating its contents.

At what may be termed the "front" end of the apron 6 are mounted the detaining-fingers 43 and 44, located one above the other and each having a weighted limb 45, said fingers being located one above the other, so as to successively engage a potato about to drop from a cell, (see Fig. 1, and more particularly Fig. 5,) it being here noticed that after the surplus potatoes have been discharged from a cell and the remaining potato thereof relieved of the spear thereof the said cell continues its motion, and as it begins to overturn with the apron 6 on the wheel 9 the finger 43 gently presses slightly on the potato as the latter emerges from the cell, when the finger 44 comes under said potato and somewhat further retards the dropping of the same; but the potato then fully drops, which is accomplished without severity or injury. Mounted below said fingers is the pocketed wheel 47, which is adapted to receive the potatoes dropped from the cells. Below said wheel 47 is an endless apron with partitions 48 thereon at intervals, forming a conveyer to which the potatoes are directed after leaving the wheel 47, said conveyer traveling in part in a casing 49, which is open at its bottom, it being noticed that said wheel 47 is geared over from the shaft 11 and also with the upper wheel 50, around which the conveyer 48 travels, the casing 49 being hung on the shaft 51 of said wheel 50. The lower wheel 52 for said conveyer is also mounted on said casing 49. When the potatoes are supplied to the conveyer, they are carried down by the latter and dropped at the open bottom of the casing and so deposited uniformly and lightly on the ground. (See Fig. 5.)

It will be seen that when the apparatus is in operation the wheels 2 impart motion to the shaft 11, and owing to the gearing and sprocket wheels and chains the various other members will receive power The potatoes in the hopper 3 are then supplied to the cells and the surplus rolled back by the action of the fingers of the wheel C', it being noticed that each cell is provided with a head 46, against which one of the potatoes is adapted to bear, and thus be prevented from being pushed out of the cell or cup by the back action of the fingers or teeth of the wheel C'. It will be observed that the potatoes are cut into pieces, as usual, and the cells C are made large enough to safely carry the largest pieces that ever may be used for planting, it being seen that if a number of smaller pieces remain in the cells after passing the fingered wheel C' the spear will secure and retain the piece in the bottom of the cell, while the others are overturned into the supplemental hopper 27. This potato which thus remains is then impaled, and the cells or cups continue their forward motion, when any potatoes that may remain loose in the cells or cups are overturned into the supplemental hopper 27. The impaled potato is then released of the spear and overturned against the fingers 43 and 44 and falling from thence is received in the wheel 47, from whence it is directed into the conveyer 48 and finally discharged from the latter. As the bottom of the casing 49 is close to the ground, the potatoes are dropped one after the other upon the ground without liability to spring up, thus causing regularity in the deposit of the potatoes.

In order to render the apparatus inoperative, the shaft 11 has a clutch 53 thereon. The collar 54 of one member thereof is engaged by the upper limb of the lever 55, the lower limb whereof is curved or deflected, as at 56, and adapted to be engaged by one of the beams G, which are pivoted to the hanger 57 and retained by the chains and rods 58 and may be raised by the latter, said chains being connected with the lever H, which is mounted on the shafts of the frame or running-gear, it being seen that when said lever is properly operated the beams G are raised, and the one adjacent to the lever 55 presses against the limb 56 thereof, so as to open the clutch 53, thus stopping rotation of the shaft 11. When the beam is lowered, the lever is released, and the spring $58^\times$ of the clutch closes the members thereof. To said lever H is pivotally attached the connecting rod or bar 59, which is also pivotally attached to the casing 49 of the conveyer 48, and thus the latter may be raised, so as to clear stones and other obstructions, and the apparatus simultaneously stopped. The lever H is also connected by a chain and rod 60 with the pivotal carrier J of the furrower-frame, whereby the latter may be raised when not required for use and lowered into operative position, said furrowers being placed one in front of the other and at an angle to the line of draft and the concaves facing in opposite directions. This causes said furrowers to cut the ground to advantage, and the clean face of each furrower allows the earth to flow free and even pass the center of the furrowers, thus also brightening all of the faces of the furrowers, while furrowers of small size may be used.

In order to regulate the degree of penetration of the furrowers, I employ the shoe 62, which, being pivoted at one end to the carrier J, is connected at the other end with the hanger 63, which is provided with a series of openings to receive the bolt 64, which is adapted to pass through either of said openings into said carrier, and thus provide for raising and lowering said hanger, and consequently the shoe.

K designates markers, whose arms are mounted on the rising and falling beams G, the axial portions of said arms having limbs 66, which when raised may be engaged by hangers 67 on the frame A, thus depressing said limbs and elevating the markers.

68, Fig. 12, represents a horizontally-arranged cross-head, which is connected by a vertical pivot to the adjacent portion of the frame A and has attached to it the hand-lever 69, so that said head may be turned to have one of its ends pass over one of the limbs 66, and thus hold the corresponding marker elevated and inoperative, while the other limb is free of the opposite end of said cross-head and so is lowered and placed in operative position. (See Figs. 3 and 12.)

Mounted on hangers 70, which are bolted or otherwise secured to the beam G, are the coverers 71, which, as is evident, will be raised when said beams are elevated, and so withdrawn from the ground when it is desired to render the same inoperative.

On the frame A is the hanger 71$^\times$, which passes through the beam G and is provided with a series of openings to receive a suitable key or pin in order to adjust the degree or depth of penetration of the coverers 71.

In order to guide the connection 59 of the lever H and casing 49 and the shoe-carrier J, I employ the slotted hanger 72, through which said connection and carrier freely pass. (See Figs. 1, 4, and 6.)

Having thus described my invention, what I claim as new, and desire to secure by Letters Patent, is—

1. In a potato-planter, a potato-receiving cell, means for overturning said cell, a finger mounted on a rotary axis adapted to sweep over said cell and a returning-hopper.

2. In a potato-planter, a hopper, a potato-receiving cell, a finger mounted on a rotary axis and adapted to sweep over said cell, a returning-hopper and means for agitating the latter.

3. In a potato-planter, a potato-receiving cell, a movable carrier therefor, and a shaking-bar on which said cell travels.

4. In a potato-planter, a potato-receiving cell, in combination with an impaling device, consisting of a sliding spear, and a carrying-stem on said spear, said cell having in its side a vertical recess in which said stem is freely fitted and adapted to slide.

5. In a potato-planter, a potato-receiving cell, in combination with an impaling device, means for advancing the latter into said cell, a foot on said device, and a shoe on the frame of the planter, said shoe being adapted to engage said foot and withdraw said device from said cell.

6. In a potato-planter, a potato-receiving cell, a device for impaling a potato therein, said cell having a member on its side provided with a recess therein, and a sliding stem on said device carrying the same, said stem being freely fitted in said recess, in combination with a friction device seated in said side member and bearing against said stem.

7. In a potato-planter, a potato-receiving cell having an impaling device therein, a carrier for said device, means for creating friction on said carrier for holding the impaling device in its set position and for preventing said device from losing its hold on a lightly-pierced potato.

8. In a potato-planter, a potato-receiving cell, an impaling device therefor, an arm having a hammer-head adapted to strike said device, a shoulder on said arm adapted to be engaged by the cell to throw back said arm, and a spring connected with said arm and a fixed member for forcibly impelling said arm and consequently its head against said impaling device.

9. In a potato-planter, a potato-receiving cell, means for advancing said cell, an impaling device, and a pressure device, the latter being adapted to enter said cell above said impaling device and a yielding arm carrying said device.

10. In a potato-planter, a cell, and a roller adapted to enter the same, a rising and falling arm carrying said roller, and means for creating pressure on said arm and consequently on said roller.

11. In a potato-planter, a potato-receiving cell, a movable carrier therefor, said cell having a pivotal connection with said carrier and a tapering piece, such as 25, on the frame which is adapted to engage the base of said cell to overturn the latter, a finger, such as C', on the connection of said cell with said carrier and a tapering piece, such as 25$^\times$ in advance of said tapering piece 25 adapted to engage said finger to return said cell to its normal position.

12. In a potato-planter, a potato-receiving cell, a carrier therefor, and a piece on the frame adapted to engage said cell to raise the same and laterally overturn it.

13. In a potato-planter, a potato-receiving cell, a carrier therefor, a piece on the frame adapted to engage said cell to raise the same and laterally overturn it, and a secondary piece adapted to engage a member of the cell to restore the latter from its overturned to its normal position.

14. In a potato-planter, a potato-receiving cell, a carrying-apron therefor, and a grooved bar on the frame to receive a member of said cell and sustain the same.

15. In a potato-planter, a main hopper, a potato-receiving cell adapted to be laterally overturned, a supplemental hopper adjacent to said cell adapted to communicate with the main hopper, and an agitator for said supplemental hopper.

16. In a potato-planter, a supplemental hopper for receiving surplus potatoes, a shaking device therein, a bar connected with said device and provided with a shoulder, a tripping-wheel adapted to engage said shoulder and advance said bar, and a spring connected with said bar and a fixed member to return said bar.

17. In a potato-planter, a main hopper, a potato-receiving cell, a carrier therefor, a supplemental hopper in communication therewith and adapted to receive the surplus potatoes from said cell, and a fingered wheel adapted to rotate in said supplemental hopper.

18. In a potato-planter, a hopper, a movable chute in communication therewith, an arm on said chute, and means for raising said arm and allowing the same to drop in combination with a cell and a traveling carrier therefor.

19. In a potato-planter, a hopper, a swinging chute in communication therewith, said chute having elongated slots, a shaft passing through said slots, a ratchet on said shaft, and a tripping-arm connected with said chute and engaging the teeth of said ratchet.

20. In a potato-planter, a potato-receiving cell, an endless carrying device therefor, and a gravitating detaining-finger at the front of said carrier adjacent to the cell.

21. In a potato-planter, a potato-receiving cell, an endless carrier therefor, a pocketed wheel below the front end of said carrier, and means for rotating said wheel in combination with a gravitating detaining-finger intermediate of said cell and wheel.

22. In a potato-planter, a discharging device consisting of a partitioned apron, a casing containing the same, and means for operating said apron, said casing being in communication with a feeding device above, and having an outlet at bottom near the ground said casing being suspended from an axis whereby it may be raised and lowered thereon for purposes of adjustment.

23. In a potato-planter, a discharging device consisting of a partitioned apron, a casing containing the same and pivotally mounted on the frame of the planter, a lever on said frame, and a connection for said lever and casing whereby the latter may be raised and lowered.

24. A potato-planter provided with coverers, a rising and falling beam carrying the same, and hangers connected with the frame of the planter, the same adjustably engaging said beam, for adjusting the depth of penetration of said coverers.

25. In a potato-planter, a lever, a furrower, a shoe, a head carrying said furrower and shoe, a coverer, a beam carrying the latter, a connection for said lever with said carrier and beam, and a hanger connected with the frame of the planter and provided with a vertical slot in which said carrier and a member of the connection of said beam are adapted to freely pass.

FRANCIS S. McWHORTER.

Witnesses:
JOHN A. WIEDERSHEIM,
C. D. McVAY.